United States Patent [19]

Torimaru et al.

[11] Patent Number: 4,589,029

[45] Date of Patent: May 13, 1986

[54] ELECTRONIC VIEWFINDER

[75] Inventors: Yasuo Torimaru; Masahiro Yoshimura, both of Nara, Japan

[73] Assignee: Sharp Kabushiki Kaisha, Osaka, Japan

[21] Appl. No.: 530,468

[22] Filed: Sep. 8, 1983

[30] Foreign Application Priority Data

Sep. 12, 1982 [JP] Japan ................ 57-216343

[51] Int. Cl.[4] .............................................. H04N 5/30
[52] U.S. Cl. .................................... 358/224; 358/180
[58] Field of Search .............. 358/224, 227, 180, 213, 358/209

[56] References Cited

U.S. PATENT DOCUMENTS 3,935,381 1/1976 Petrocelli et al. .................. 358/180
4,002,824 1/1977 Petrocelli et al. .................. 358/180
4,079,413 3/1978 Yamashita ........................... 358/180

Primary Examiner—Gene Z. Rubinson
Assistant Examiner—Stephen Brinich
Attorney, Agent, or Firm—Staas & Halsey

[57] ABSTRACT

An electronic viewfinder comprises a plurality of picture elements which form a matrix image display device. A drive circuit is connected to the display device to cause the electronic viewfinder to selectively display a portion of the image, corresponding to the video signal being received by the drive circuit, at an increased magnification. The drive circuit includes frequency divider circuits for providing shift clock pulse signals at frequencies corresponding to the available rates of magnification of the image portion. The drive circuit further includes delay circuits for delaying synchronizing signals to select the portion of the image which is to be displayed. The electronic viewfinder having this drive circuit, is capable of providing increased resolution for a portion of an image by enlarging the image, while allowing the electronic viewfinder to be formed by a relatively small number of picture elements, so that the electronic viewfinder may be miniaturized and manufactured at a reduced cost.

9 Claims, 7 Drawing Figures

FIG. 1
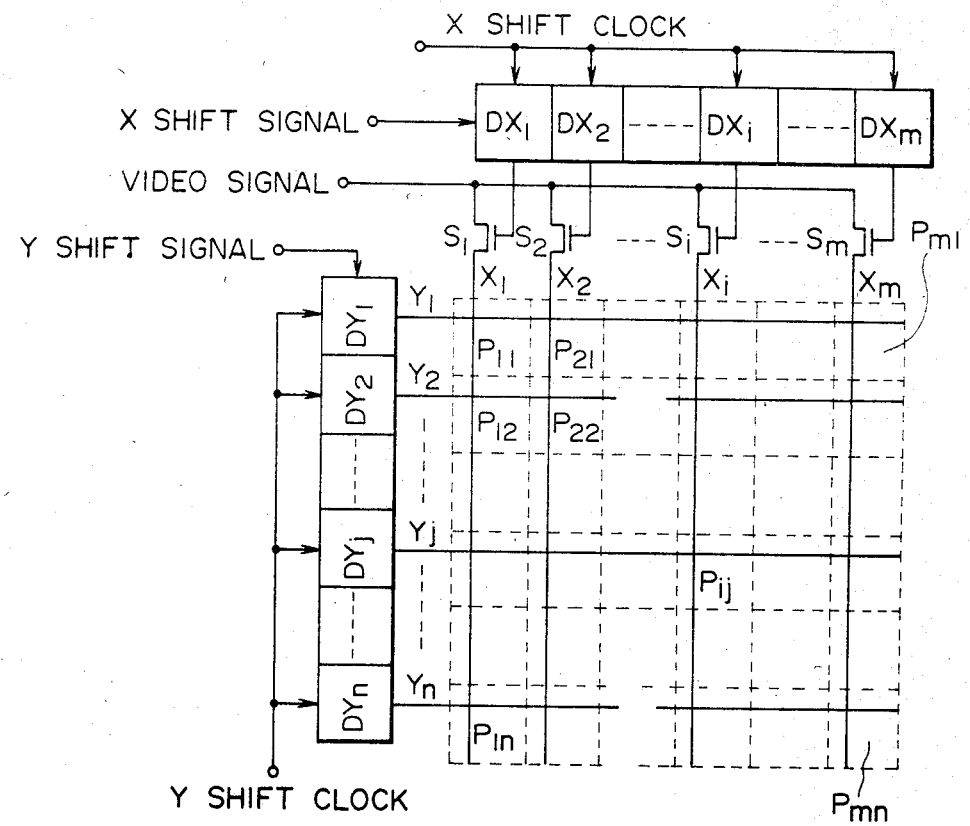
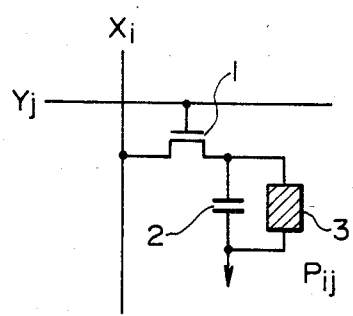
FIG. 2
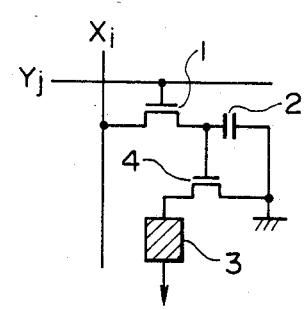
FIG. 3
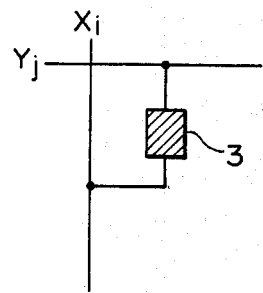
FIG. 4

ELECTRONIC VIEWFINDER

BACKGROUND OF THE INVENTION

This invention relates to a viewfinder for a VTR (video tape recording) camera or the like which uses a dot matrix image display device, in which picture elements are arranged in matrix form.

The resolution, which determines the picture quality of a matrix image display device, depends on the number of picture elements which are arranged in rows and columns,(i.e. in matrix form), in the device. For example, in order to display a television image, a matrix of approximately 250 to 350 rows by 250 to 350 columns is required. However, there has been a tendency to reduce the number of picture elements in the display device of electronic viewfinders, in an effort to reduce manufacturing cost and to miniaturize the electronic viewfinder, thereby leading to a decrease in resolution. Despite this decrease in resolution, when a matrix image display device is applied to the electronic viewfinder of a VTR camera, the angle of view (i.e., the composition of the picture) can be determined. However, because of the low resolution, the focusing of the lens on an object, which is one of the essential functions of the electronic viewfinder, cannot be achieved readily.

SUMMARY OF THE INVENTION

It is a principal object of the present invention to provide an electronic viewfinder which overcomes the deficiencies of the prior art.

A further object of the present invention is to provide an electronic viewfinder, including a matrix image display device having a resolution which is lower than the inherent resolution of a display signal, which displays any desired portion of the image with increased magnification.

A still further object of the present invention is to provide an electronic viewfinder, including a matrix image display device having a small number of picture elements, which displays any desired portion of the image with increased magnification.

A still further object of the present invention is to provide an electronic viewfinder which increases the resolution of the image displayed by it's matrix image display device by enlarging the image, thereby allowing a VTR camera lens or the like to focus on an object.

The present invention is directed to an electronic viewfinder connected to receive a video composite signal. The electronic viewfinder includes first means for displaying an image and second means, connected to the first means and connected to receive the video composite signal, for providing a video signal to the first means. The second means includes a switch for providing first and second signals so as to cause the first means to provided a standard display or a magnified display. When the standard display is provided, the entire image is displayed so that the angle of view may be set. When the magnified display is provided, a portion of the image is displayed in an increased size so that focusing can be conducted by increasing the resolution of a portion of the image.

These together with other objects and advantages, which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an equivalent circuit diagram of a matrix image display device used in an embodiment of the present invention;

FIG. 2 is an equivalent circuit diagram of a first example of the picture element $P_{ij}$ of FIG. 1;

FIG. 3 is an equivalent circuit diagram of a second example of the picture element $P_{ij}$ of FIG. 1;

FIG. 4 is an equivalent circuit diagram of a third example of the picture element $P_{ij}$ of FIG. 1;

DESCRIPTION OF THE PREFERRED EMBODIMENTS

Figure 5:
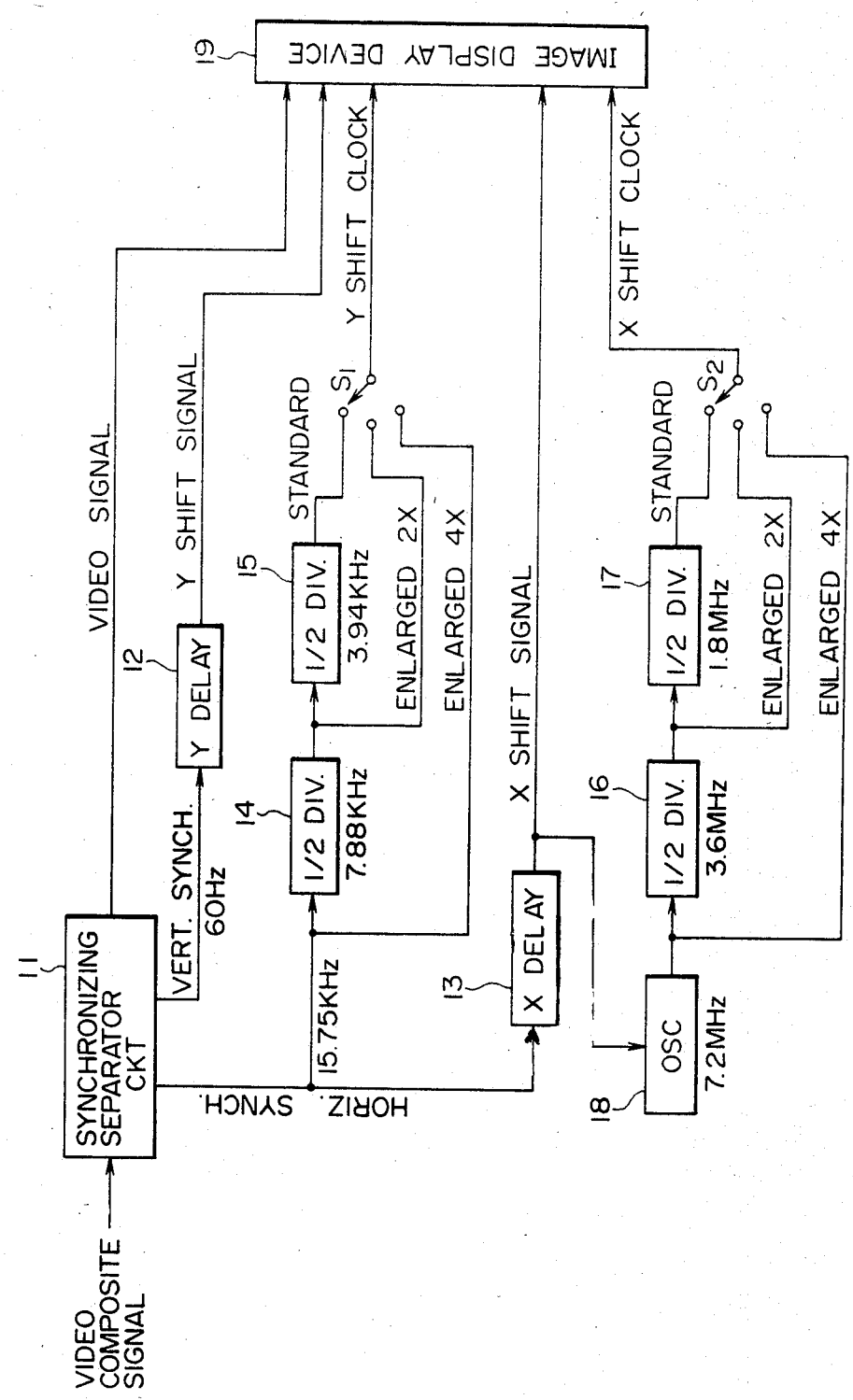
FIG. 5 is a block diagram of an embodiment of the drive control circuit, connected to the image display device of FIG. 1, for the electronic viewfinder of the present invention.

FIG. 1 is an equivalent circuit diagram of a dot matrix image display device having picture elements arranged in a matrix of m rows and n columns. In FIG. 1, reference characters $DX_1, \ldots DX_i \ldots$, and $DX_m$ designate row scanning X shift registers; reference characters $DY_1, \ldots DY_j \ldots$, and $DY_n$ designate column scanning Y shift registers; reference characters $S_1, \ldots S_i \ldots$, and $S_m$ designate X line selecting transistors; reference characters $X_1, \ldots X_i \ldots$, and $X_m$ designate X lines; $Y_1, \ldots Y_j \ldots$, and $Y_n$ designate Y lines; and reference characters $P_{11}, \ldots P_{ij} \ldots$, and $P_{mn}$ designate picture elements in matrix form.

Each picture element $P_{ij}$ may be formed as shown in FIGS. 2, 3 or 4. FIGS. 2 and 3 include a selecting transistor 1, an image data storing capacitor 2 and a display element 3, such as a liquid crystal element, an EL (electroluminescent) element or a fluorescent element. In FIG. 3, the picture element further comprises a driving transistor 4. In FIG. 4, the picture element includes only the display element 3. In general, the picture elements of FIGS. 2 or 3 are so-called "switch matrix type picture elements" having an active switch, and the picture element of FIG. 4 is a so-called "ordinary matrix type picture element" having no active element.

The operation of the circuit of FIG. 1 will be described for the case of displaying a television image. When the $Y_1$ line is selected by a Y shift signal synchronous with a vertical synchronizing signal, and the $X_1$ line selecting transistor $S_1$ is rendered conductive (on) by an X shift signal synchronous with a horizontal synchronizing signal, the picture element $P_{11}$ is selected to emit light according to the amplitude of a video signal. When one X shift clock pulse is applied, the $X_2$ line selecting transistor $S_2$ is turned on, so that the picture element $P_{21}$ emits light in accordance with the level of the video signal at that time. Similarly, the remaining selecting transistors $S_3$ through $S_m$ are scanned. Thus, the image data is written in the picture elements $P_{11}$ through $P_{m1}$ connected to the $Y_1$ line. In the picture elements of FIGS. 2 or 3, the image data is stored in the capacitor 2, and therefore the emission of light is continued until the picture element is selected again in the next field. When one Y shift clock is applied and the X shift signal is supplied again, the picture element $P_{12}$ is selected. All the picture elements are scanned in this manner, so that one image field is written in the picture elements.

FIG. 5 is a block diagram of an embodiment of a drive control circuit, connected to the image display device of FIG. 1, for driving the image display device in accordance with the present invention. For convenience, the drive control circuit of FIG. 5 will be described for the case where an NTSC video signal is used to display an image without interlaced scanning. Furthermore, it will be assumed that in the image display device of FIG. 1, m (X lines)=96, and n (Y lines)=60.

The drive circuit of FIG. 5 includes a synchronizing separator circuit 11 for obtaining a horizontal synchronizing signal, a vertical synchronizing signal and a video signal from an NTSC video composite signal. A Y delay circuit 12 delays the vertical synchronizing signal for a predetermined period of time, and an X delay circuit 13 delays the horizontal synchronizing signal for a predetermined period of time. The drive circuit further includes four ½ frequency dividers 14, 15, 16 and 17, and a high frequency oscillator 18 for oscillating in synchronization with the horizontal synchronizing signal. A pair of switches $S_1$ and $S_2$ are operated in tandem to select the shift clock pulse frequency, and the delay times (for controlling the shift signals) of the delay circuits 12 and 13 are set to predetermined values. When the switches $S_1$ and $S_2$ are operated and the delay times are set, a standard size image, an image portion which is enlarged by a magnification of ×2 (enlarged four times in area), or an image portion which is enlarged by a magnification of ×4 (enlarged sixteen times in area), can be obtained. An image display device 19, for example the display device of FIG. 1, is connected to the drive circuit.

An example of the relationship between magnification and clock frequency is set forth in Table 1 below. The portion of an image which is to be enlarged can be selected by varying the delay times. Table 1 lists the delay times for the case where a central portion of the image is enlarged (see FIG. 6).

TABLE 1

| | X shift clock frequency (MHz) | X delay time (µs) | Y shift clock frequency (KHz) | Y delay time (ms) |
|---|---|---|---|---|
| Standard size | 1.8 | 0 | 3.94 | 0 |
| ×2 enlargement | 3.6 | 13.3 | 7.88 | 4.17 |
| ×4 enlargement | 7.2 | 20.0 | 15.75 | 6.25 |

In order to display an image having the standard size, the X shift clock frequency is set to 1.8 MHz as illustrated in FIG. 5 and Table 1. As is well known in the display art, a horizontal period of 63.5 µs has an effective image data period of 53.3 µs. In displaying an image having the standard size, the video signal should be sampled equally for the number (96) of rows. Therefore, the X shift clock freqency fx is as follows:

$$fX = \frac{96}{53.3 \times 10^{-6}s} \simeq 1.8 \text{ MHz} \qquad (1)$$

On the other hand, the Y shift clock pulse should switch the selection of the sixty (60) Y lines with respect to 240 effective scanning lines (which are available when no interlaced scanning is carried out), so that the Y shift clock pulse selects one Y line per four effective scanning lines. Therefore, the Y shift clock frequency fY is as follows:

$$fY = \frac{15.75 \times 10^3 \text{ Hz}}{4} \simeq 3.94 \text{ KHz} \qquad (2)$$

As shown in FIG. 5, the oscillating signal (having a 7.2 MHz frequency) output by the high frequency oscillator 18 which oscillates in synchronization with the horizontal synchronizing signal, is frequency-divided by the ½ frequency dividers 16 and 17, to provide the X shift clock pulse having a frequency of 1.8 MHz. The Y shift clock pulse, with a frequency 3.94 KHz, can be obtained by directly frequency-dividing the 15.75 KHz horizontal synchronizing signal using the ½ frequency dividers 14 and 15. When an image having the standard size is to be displayed, the delay times of the Y delay circuit 12 and the X delay circuit 13 are set to zero.

Figure 6:
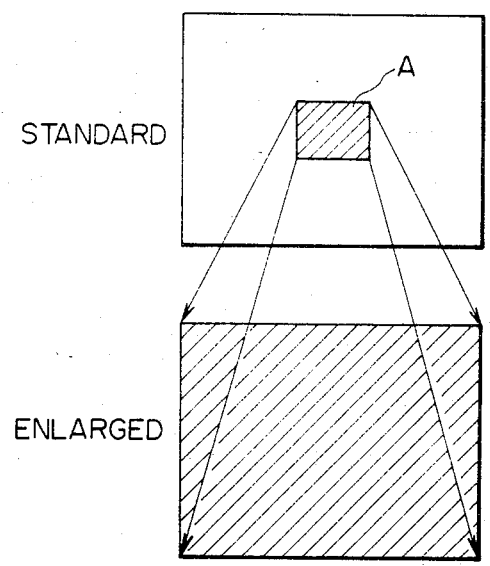
FIG. 6 is a schematic diagram illustrating the enlargement of a portion of an image in accordance with the present invention.

When a portion of an image is to be displayed with a magnification of ×2, both the X shift clock pulse and the Y shift clock pulse should have frequencies which are two times as high as the frequencies of the shift clock pulses used to display the standard size image. These doubled frequencies are obtained at the outputs of the ½ frequency dividers 14 and 16, respectively. In this case, if the X and Y shift signals are applied, without delay, based on the synchronizing signals, the upper left-hand portion of the image will be magnified. When it is required to enlarge the central portion A of the image (as illustrated in FIG. 6), the delay times of the X delay circuit 13 and the Y delay circuit 12 are determined as follows. The X delay circuit 13 should delay the horizontal synchronizing signal for one quarter (¼) of the horizontal effective period (53.3 µs), so that the X delay time tdX is:

$$tdX = 53.3 \times 10^{-6}s \times \tfrac{1}{4} \simeq 13.3 \text{ µs} \qquad (3)$$

Similarly, the Y delay circuit should delay the vertical synchronizing signal for one quarter (¼) of one field time (16.67 ms), so that the Y delay time tdY is:

$$tdY = 16.67 \times 10^{-3}s \times \tfrac{1}{4} \simeq 4.17 \text{ ms} \qquad (4)$$

The above determinations are also applicable to the case of displaying a portion of an image with a magnification of ×4, wherein the frequencies and delay times are as indicated in Table 1. When a ×4 magnification of an image is to be displayed, the switches $S_1$ and $S_2$ provide the horizontal synchronizing signal (15.75 KHz) and the output of the oscillator 18 (7.2 MHz) as the Y shift clock pulse signal and the X shift clock pulse signal, respectively.

Figure 7:
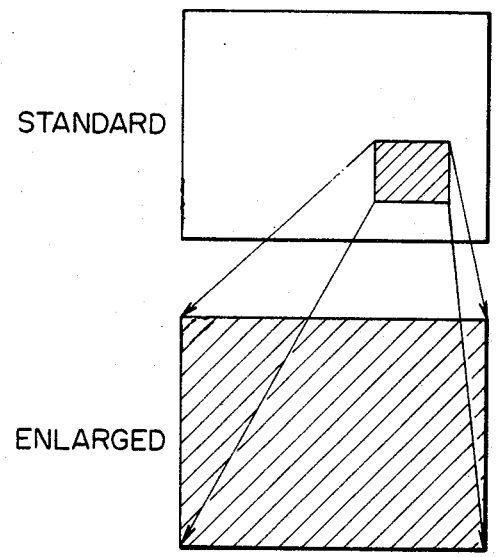
FIG. 7 is a schematic diagram illustrating the enlargement of another portion of an image in accordance with the present invention.

FIG. 7 illustrates a portion of an image which is enlarged, the portion being selected by increasing the X and Y delay times. Further, any portion of the image can be selected for enlargement by changing the delay times of the Y delay circuit 12 and the X delay circuit 13.

In the above-described embodiment, the drive control circuit comprises digital delay circuits 12 and 13, and the digital frequency dividers 14, 15, 16 and 17. Therefore, the magnification of image portions is accurate in both the horizontal and vertical directions, so that the displayed images are stable. Further, any portion of the image can be enlarged merely by changing the delay times of the X and Y delay circuits 12 and 13. In addition, since the circuit for enlarging and displaying images has a relatively simple construction, it can be manufactured at low cost.

Although in the above-described embodiment two frequency divider stages are employed, the invention may alternatively include a single frequency divider stage or more than two frequency divider stages, so that the magnification can be set to a desired value or so that the number of possible magnifications can be increased. In the description of the invention set forth above with respect to FIG. 5, the matrix was described as having ninety rows and sixty columns; however, it should be understood that the technical concept of the invention is also applicable to image display devices having different numbers of rows and columns (e.g., a device having 192 rows and 120 columns).

As is apparent from the above description, the electronic viewfinder of the present invention employs a matrix display device with a small number of picture elements. Although it has a low resolution, it can set the angle of view (i.e., the composition of the picture), thereby contributing to a reduction in the manufacturing cost of the electronic viewfinder and to miniaturization of the same. However, the viewfinder of the invention can enlarge any portion of an image in the display. Therefore, with the electronic viewfinder of the present invention, the lens can be focused on the object and the resolution of a portion of the image can be increased. Thus, the electronic viewfinder of the present invention is most suitable for VTR cameras.

The many features and advantages of the invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be restored to, falling within the scope of the invention.

What is claimed is:

1. An electronic viewfinder connected to receive a video composite signal, comprising:
   first means for receiving the video composite signal and for generating a video signal, a magnification signal and an image portion selection signal; and
   second means, operatively connected to said first means, for receiving the video signal, the magnification signal and the image portion selection signal, and for displaying a portion of an image corresponding to the video signal at a selected magnification as indicated by the magnification signal, the portion of the image to be displayed being determined by the image portion selection signal, said first means including:
      third means, operatively connected to receive the video composite signal and operatively connected to said second means, for providing the video signal and for providing first and second synchronizing signals;
      fourth means, operatively connected to said third means and to said second means, for receiving the first and second synchronizing signals and for providing first and second shift signals to said second means as the image portion selection signal; and
      fifth means, operatively connected to said third means, said fourth means and said second means, for receiving the first synchronizing signal and the second shift signal, and for providing first and second shift clock pulse signals to said second means as the magnification signal, said fifth means including:
         a first divider circuit, operatively connected to said third means, for dividing the frequency of the second synchronizing signal and for providing an output;
         a second divider circuit, operatively connected to said first divider circuit, for dividing the frequency of the output of the first divider circuit and for providing an output;
         a first switch, operatively connected to said third means and to the outputs of said first and second divider circuits, for selectively providing one of the second synchronizing signal and the outputs of said first and second divider circuits as the first shift clock pulse signal;
         an oscillator circuit, operatively connected to said third means, for generating an oscillation signal in dependence upon the second shift signal;
         a third divider circuit, operatively connected to said oscillator circuit, for dividing the frequency of the oscillation signal and for providing an output;
         a fourth divider circuit, operatively connected to said third divider circuit, for dividing the frequency of the output of said third divider circuit and for providing an output; and
         a second switch, operatively connected to said oscillator circuit and said third and fourth divider circuits, for selectively providing one of the oscillation signal and the outputs of said third and fourth divider circuits to said second means as the second shift clock pulse signal.

2. An electronic viewfinder as set forth in claim 1, wherein said first, second, third and fourth divider circuits are one-half frequency divider circuits.

3. An electronic viewfinder as set forth in claim 2, wherein said fourth means comprises:
   a first delay circuit, operatively connected to said third means and said second means, for receiving the first synchronizing signal and for providing the first shift signal to said second means; and
   a second delay circuit, operatively connected to said third means and to said second means, for receiving the second synchronizing signal and for providing the second shift signal to said second means.

4. An electronic viewfinder connected to receive a video composite signal, comprising:
   a synchronizing separator circuit, connected to receive the video composite signal, for providing a video signal and first and second synchronizing signals;
   a delay circuit, operatively connected to said synchronizing separator circuit, for receiving the first and second synchronizing signals and for generating first and second shift signals;
   a divider circuit, operatively connected to said synchronizing separator circuit and said delay circuit, for receiving the second synchronizing signal and the second shift signal, and for generating first and second shift clock pulse signals; and a display device, operatively connected to said synchronizing separator circuit, said delay curcuit, and said divider circuit, for receiving the video signal and the first and second shift signals, and for displaying a portion of an image corresponding to the video signal in accordance with a magnification as indicated by the first and second shift clock pulse signals, the portion of the image to be displayed being indicated by the first and second shift signals, said divider circuit including:
  a first frequency divider circuit, operatively connected to said synchronizing separator circuit, for dividing the frequency of the second synchronizing signal and for generating a first divided output signal;
  a first switch, operatively connected to said synchronizing separator circuit, said first frequency divider circuit and said display device, for providing one of the second synchronizing signal and the first divided output signal, as the first shift clock pulse signal, to said display device;
  an oscillator, operatively connected to said delay circuit for generating an oscillation signal in dependence upon the second shift signal;
  a second frequency divider circuit, operatively connected to said oscillator, for dividing the frequency of the oscillation signal and for providing a second divided output signal; and
  a second switch, operatively connected to said oscillator, said second divider circuit, and said display device, for providing one of the oscillation signal and the second divided output signal, as the second shift clock pulse signal, to said display device.

5. An electronic viewfinder as set forth in claim 4, wherein said first and second frequency divider circuits are one-half frequency divider circuits.

6. An electronic viewfinder as set forth in claim 5, wherein said delay circuit comprises:
  a first delay circuit, operatively connected between said synchronizing separator circuit and said display device, for receiving the first synchronizing signal and for generating the first shift signal; and
  a second delay circuit, operatively connected between said synchronizing separator circuit and said display device, for receiving the second synchronizing signal and for generating the second shift signal.

7. An electronic viewfinder as set forth in claim 4, wherein said delay circuit comprises:
  a first delay circuit, operatively connected between said synchronizing separator circuit and said display device, for receiving the first synchronizing signal and for generating the first shift signal; and
  a second delay circuit, operatively connected between said synchronizing separator circuit and said display device, for receiving the second synchronizing signal and for generating the second shift signal.

8. An electronic viewfinder connected to receive a video composite signal, comprising:
  first means for receiving the video composite signal and for generating a video signal, a magnification signal and an image portion selection signal; and
  second means, operatively connected to said first means, for receiving the video signal, the magnification signal and the image portion selection signal, and for displaying a portion of an image corresponding to the video signal at a selected magnification as indicated by the magnification signal, the portion of the image to be displayed being determined by the image portion selection signal, said first means including:
    third means, operatively connected to receive the video composite signal and operatively connected to said second means, for providing the video signal and for providing first and second synchronizing signals;
    fourth means, operatively connected to said third means and to said second means, for receiving the first and second synchronizing signals and for providing first and second shift signals to said second means as the image portion selection signal, said fourth means including:
      a first delay circuit, operatively connected to said third means and said second means, for receiving the first synchronizing signal and for providing the first shift signal to said second means; and
      a second delay circuit, operatively connected to said third means and to said second means, for receiving the second synchronizing signal and for providing the second shift signal to said second means; and
    fifth means, operatively connected to said third means, said fourth means and said second means, for receiving the first synchronizing signal and the second shift signal, and for providing first and second shift clock pulse signals to said second means as the magnification signal.

9. An electronic viewfinder connected to receive a video composite signal, comprising:
  first means for displaying an image; and
  second means, operatively connected to said first means and connected to receive the video composite signal, for providing a video signal to said first means, said second means including switching means for providing first and second control signals to said first means, said switching means providing the first control signal when said first means is to be operated in a standard display mode to set the angle of view, said switching means providing the second control signal when said first means is to be operated in a magnification display mode for focusing, said first means displaying a selected portion of the image which is magnified by a selected magnification when said first means is operated in the magnification display mode.

* * * * *

UNITED STATES PATENT AND TRADEMARK OFFICE
CERTIFICATE OF CORRECTION

PATENT NO. : 4,589,029

DATED : MAY 13, 1986

INVENTOR(S) : YASUO TORIMARU ET AL.

It is certified that error appears in the above-identified patent and that said Letters Patent is hereby corrected as shown below:

Col. 1, line 25, ";" should be --,--.

Col. 2, line 37, ", and Pmn" (italics) should be --, and $P_{mn}$ (not in italics).

Col. 7, line 2, "curcuit" should be --circuit--.

Signed and Sealed this

Nineteenth Day of August 1986

[SEAL]

Attest:

DONALD J. QUIGG

Attesting Officer

Commissioner of Patents and Trademarks